(12) United States Patent
Uemura et al.

(10) Patent No.: US 7,835,604 B2
(45) Date of Patent: Nov. 16, 2010

(54) FIBER BRAGG GRATING ELEMENT

(75) Inventors: Yasuo Uemura, Tokyo (JP); Kazuhiko Kashima, Tokyo (JP); Toshiyuki Inukai, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 134 days.

(21) Appl. No.: 11/816,552

(22) PCT Filed: Feb. 16, 2006

(86) PCT No.: PCT/JP2006/302746

§ 371 (c)(1),
(2), (4) Date: Feb. 21, 2008

(87) PCT Pub. No.: WO2006/095548

PCT Pub. Date: Sep. 14, 2006

(65) Prior Publication Data

US 2009/0052828 A1    Feb. 26, 2009

(30) Foreign Application Priority Data

Feb. 17, 2005    (JP) .............................. 2005-041086

(51) Int. Cl.
*G02B 6/34*    (2006.01)
*G02B 6/26*    (2006.01)

(52) U.S. Cl. .......................................... 385/37; 385/39
(58) Field of Classification Search ................... 385/37, 385/39
See application file for complete search history.

(56) References Cited

U.S. PATENT DOCUMENTS 6,999,659 B1 * 2/2006 Nowak et al. .................. 385/37
2003/0142912 A1 * 7/2003 Sakamoto et al. ............. 385/37

FOREIGN PATENT DOCUMENTS

| JP | 7 244209 | 9/1995 |
|---|---|---|
| JP | 07-244209 | * 9/1995 |
| JP | 2002 328238 | 11/2002 |

* cited by examiner

*Primary Examiner*—Uyen-Chau N Le
*Assistant Examiner*—Kajli Prince
(74) *Attorney, Agent, or Firm*—Oblon, Spivak, McClelland, Maier & Neustadt, L.L.P.

(57) ABSTRACT

The present invention provides a fiber Bragg grating element which is simply configured and capable of obtaining a high cut-off amount exceeding 40 dB in a wide range. A fiber Bragg grating element of the present invention has a plurality of gratings formed in an optical waveguide having a core and a cladding around the core thereby to perform high rejection filtering on an input optical signal over a desired bandwidth~ the gratings being formed with a grating pitch between adjacent two of the gratings increasing toward a center in a longitudinal direction of the optical waveguide.

10 Claims, 8 Drawing Sheets

FIBER BRAGG GRATING ELEMENT

TECHNICAL FIELD

The present invention relates to a fiber Bragg grating element that can serves as an optical filter capable of high rejection filtering of an input optical signal over a wide bandwidth.

BACKGROUND ART

Conventionally, there are many optical communication devices that make use of optical filters using fiber Bragg gratings (FBG) to cut off light over a desired bandwidth (see patent document 1). This FBG utilizes "laser-induced refractive-index change" in which an optical fiber is irradiated with ultraviolet light thereby to increase the refractive index. As the laser-induced refractive-index change is larger, a higher rejection can be obtained. The FBG is a device that creates a periodic perturbation in the refractive index of a fiber core. This periodic perturbation in the refractive index is formed by two-beam interferometry, phase-mask method or the like. With this periodic perturbation in the refractive index, light is reflected in a wavelength range having a center wavelength $\lambda_B$ that is called Bragg center wavelength, and is finally rejected in the Bragg center wavelength range. The Bragg center wavelength $\lambda_B$ is expressed as $\lambda_B=2n\Lambda$. Here, n is an effective refractive index of an optical fiber and $\Lambda$ is a grating pitch which means a period of periodic perturbation in the refractive index. Such FBG is used in a WDM communication system as well as a multiplexer/demultiplexer, a line monitoring filter, a temperature sensor and a distortion sensor.

Patent document 1: Japanese Patent Laid-open Publication No. 2002-328238

SUMMARY OF THE INVENTION

Problems to be solved by the Invention

Figure 14:
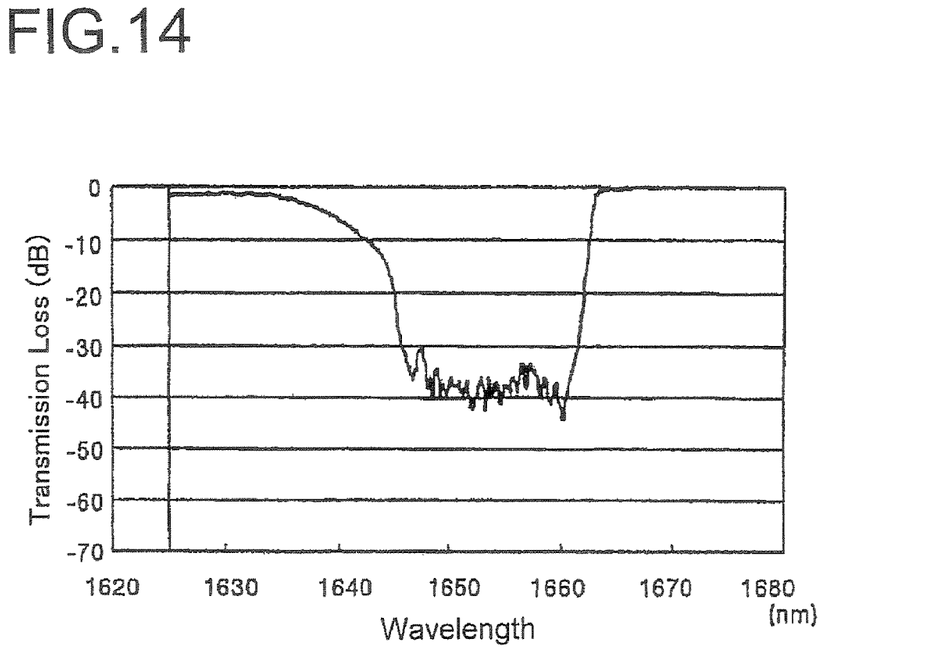
FIG. 14 is a graph showing rejection by a conventional wide-band fiber Bragg grating element with a grating length of 7 mm.

Meanwhile, when an optical signal is to be cut off over a wide bandwidth of about 10 nm, the FBG is formed as chirped grating. In addition, when a higher rejection is desired over this wide bandwidth, the grating length is increased to realize the higher rejection. For example, FIG. 14 shows light is rejected over the bandwidth of about 10 nm of from 1650 to 1659 nm by chirped gratings of 7 mm in grating length, resulting in rejection of about 30 to 35 dB (in FIG. 14, the rejection is expressed as "transmission loss", and this "transmission loss" is referred to as "rejection" below). Besides, FIG. 15 shows light is rejected over the bandwidth of about 10 nm of from 1650 to 1659 nm by chirped gratings of 13 mm in grating length, resulting in rejection of about 35 to 40 dB.

Figure 15:
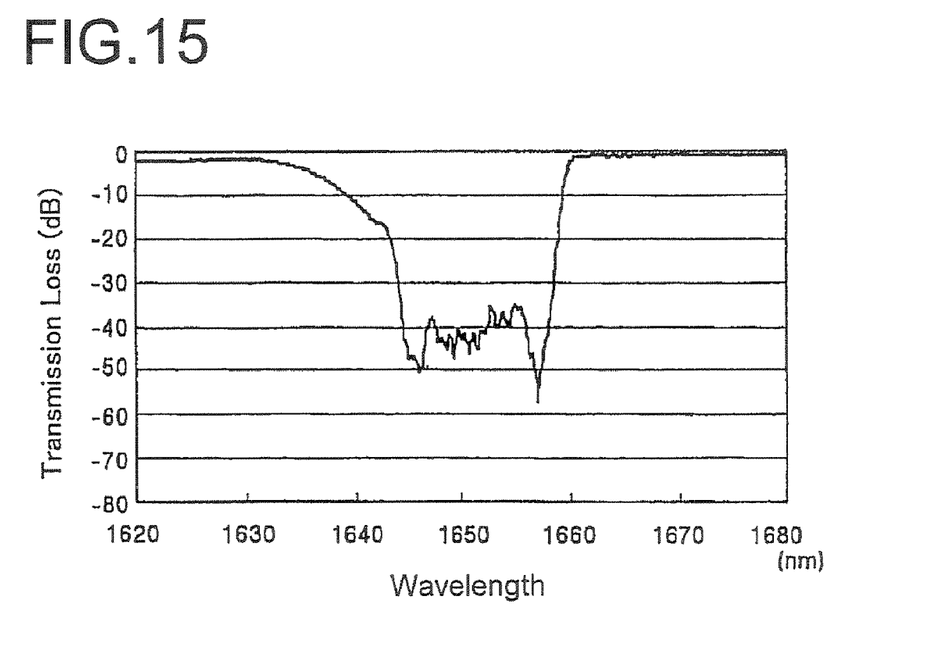
FIG. 15 is a graph showing rejection by the conventional wide-band fiber Bragg grating element of FIG. 14 of which the grating length is increased to 13 mm.

Here, it was expected when the chirped grating length was twice longer, a rejection would be doubled and about 80 dB in the case of FIG. 15. However, the rejection shown in FIG. 15 is little (about 5 dB) larger. That is, there is a limit to obtain a higher rejection simply by elongating the chirped grating.

On the other hand, in the field of optical communications in recent years, there has been a need to separate monitoring light from communication signal light. In order to minimize influences on the communication signal light due to leakage of monitoring light into the communication signal light, it is sometimes desired, for example, to obtain a rejection of about 40 dB stably over a wide bandwidth. For this purpose, there is an increasing demand for FBG capable of stably obtaining a rejection in excess of 40 dB over a wide bandwidth.

The present invention was carried out in view of the foregoing and has an object to provide a fiber Bragg grating element which is simply configured however is capable of obtaining high rejection exceeding 40 dB over a wide bandwidth.

Means for Solving the Problems

In order to solve the above-mentioned problems and achieve the object, one embodiment of the invention is a fiber Bragg grating element performing high rejection filtering on an input optical signal over a desired bandwidth, the fiber Bragg grating element comprising: a plurality of gratings formed in an optical waveguide having a core and a cladding around the core, the gratings being formed with a grating pitch between adjacent two of the gratings increasing toward a center in a longitudinal direction of the optical waveguide.

Further, another feature is a fiber Bragg grating element performing high rejection filtering on an input optical signal over a desired bandwidth, the fiber Bragg grating element comprising: a plurality of gratings formed in an optical waveguide having a core and a cladding around the core, the optical waveguide having two optical fibers bonded at respective ends to each other, the gratings being formed in the optical fibers with a grating pitch between adjacent two of the gratings increasing toward the respective ends.

Further, the another feature is characterized in that the cladding of the optical waveguide is doped with a material photosensitive to ultraviolet radiation to have formed in the cladding same gratings as the gratings in the core.

Further, another feature is characterized in that the optical waveguide has a numerical aperture equal to or greater than 0.2.

Further, another feature is characterized in that the core of the optical waveguide has a peripheral portion of ring-shaped section having a refractive index higher than a refractive index of the core, and the gratings are formed in at least the core.

Further, another feature is characterized in that in the optical waveguide, the gratings are formed in at least the core, and a material having a refractive index higher than a refractive index of the cladding is provided on an outer surface of the cladding so as to cover the gratings in the core partially or entirely.

Further, another feature is characterized in that the desired bandwidth is equal to or greater than 10 nm.

Further, another feature is characterized in that a rejection is equal to or greater than 40 dB over the desired bandwidth.

EFFECTS OF THE INVENTION

As the fiber Bragg grating element of this invention is configured to have a pitch between adjacent gratings increasing toward the center in the longitudinal direction of the fiber, it brings about an effect to obtain, with a simple configuration, a high rejection exceeding 40 dB in any wide range stably.

DESCRIPTION OF REFERENCE NUMERALS $1a_1$-$1a_8$ optical branch line
2 OTDR
3, 28 optical splitter
10 transmitting unit
18 optical coupler
20 ONU
21, 21-1 ... 21-8, 21a, 21b, 21c, 21d FBG
22 optical trunk line
24 user
25 fiber selector
26 controller
30-1, 30-3 optical connecter
31-1, 31-3 optical receiving portion
32-1, 32-3 O/E portion
33-1, 33-3 reception processing portion
40, 50, 60, 70 FBG element
41, 51, 61, 71 core
42, 52, 62, 72 cladding
43, 73 high refractive-index portion
44, 45 optical fiber
44a, 45a end
$\lambda a$, $\lambda b$ wavelength of communication light
$\lambda c_1$-$\lambda c_8$ wavelength of monitoring light

BEST MODE FOR CARRYING OUT THE INVENTION

Hereinafter, preferred embodiments of a fiber Bragg gating element of the present invention will be described.

Embodiment 1

Figure 1:
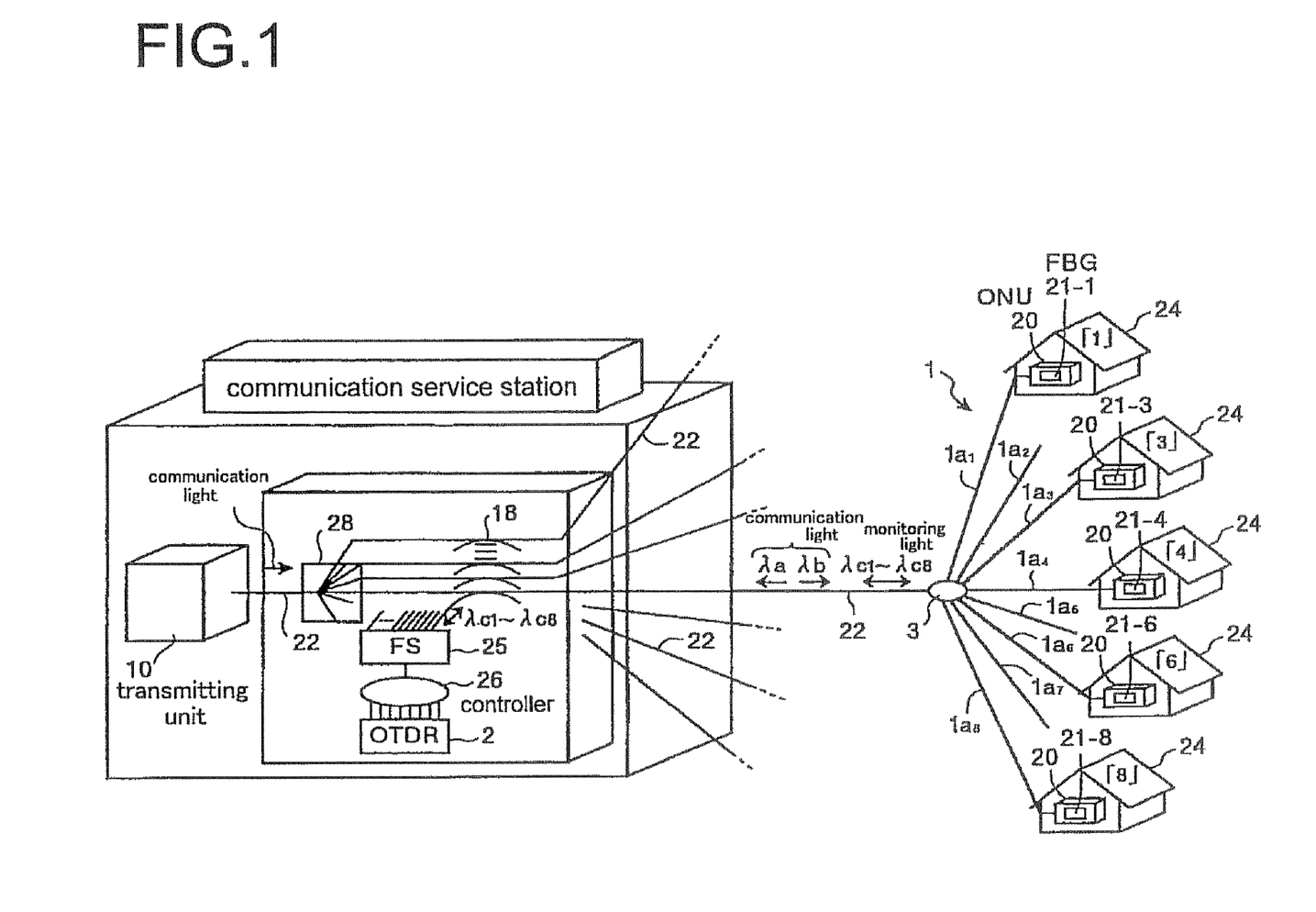
FIG. 1 is a view schematically illustrating a configuration of an optical branch line monitoring system using a fiber Bragg grating element according an embodiment of the present invention.

FIG. 1 is a view schematically illustrating a configuration of an optical branch line monitoring system using a fiber Bragg grating element according an embodiment 1 of the present invention. This optical branch line monitoring system has a transmitting unit 10 connected to an optical trunk line 22, and the optical trunk line 22 is divided by an optical splitter 28 into a plurality of optical trunk lines 22. Each of these divided optical trunk lines 22 extends outside the system via an optical coupler 18 and further divided into plural optical branch lines $1a_1$ to $1a_8$ by an optical splitter 3. Each of the optical branch lines $1a_1$ to $1a_8$ is connected to an ONU (Optical Network Unit) 20 of a user 24. Here, the optical splitter 3 has an optical line monitoring device (not shown) which receives and outputs only monitoring light of wavelengths $\lambda c_1$ to $\lambda c_8$ corresponding to the optical branch lines $1a_1$ to $1a_8$, respectively.

A controller 26 controls output of monitoring light of variable wavelength from an OTDR (Optical Time Domain Reflectometer) 2 to output the light to a fiber selector 25 (hereinafter referred to as "FS") and also controls reception measurements. The OTDR 2 is connected via these controller 26 and FS 25 to the optical couplers 18.

Each ONU 20 is provided with FBG (fiber Bragg gratings) (one of FBGs 21-1 to 21-8) which is assigned a unique wavelength of the monitoring light and reflects monitoring light of the assigned wavelength to prevent the monitoring light from being output to the receiving side. The FBGs 21-1 to 21-8 have the same configuration and property of cutting off monitoring light over a bandwidth of about 10 nm by about 60 dB.

The controller 26 periodically outputs monitoring light of wavelengths $\lambda c_1$ through $\lambda c_8$, which is sent to the optical trunk lines 22 via the FS 25 and each optical coupler 18. Then, the FS 25 selects an optical trunk line 22 to which the ES 25 outputs the monitoring light. In the optical coupler 18, communication light of wavelength $\lambda b$ propagating from the transmitting unit 10 and, for example, monitoring light of wavelength $\lambda c_1$ are input to the optical splitter 3, and then, the communication light of wavelength $\lambda b$ is input to the ONUs 20 via the optical branch lines $1a_1$ to $1a_8$ and the monitoring light of wavelength $\lambda c_1$ is input to the ONU 20 connected to the optical branch line $1a_1$.

Figure 2:
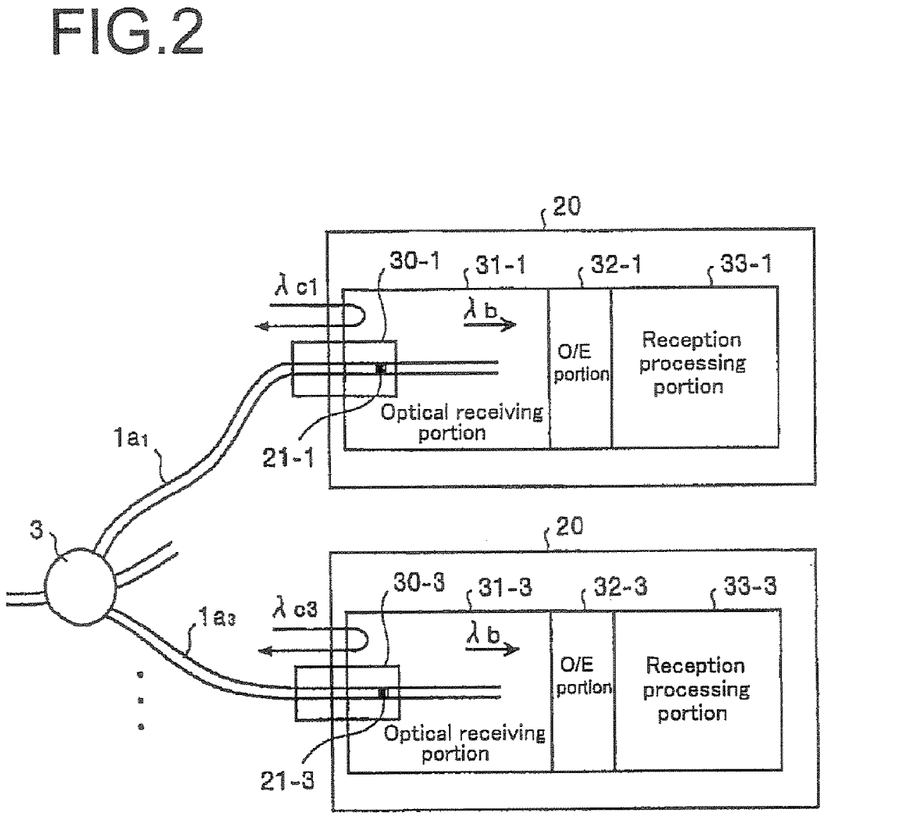
FIG. 2 is a view illustrating monitoring line and communication light which are transmitted to the ONU (Optical Network Unit)

As illustrated in FIG. 2, the monitoring light of wavelength $\lambda c_1$ is reflected by the FBG 21-1, however, the communication light of wavelength $\lambda b$ is received as it is by an optical receiving portion 31-1, optical/electrical-converted by an O/E portion 32-1 and input to a reception processing portion 33-1. Likewise, when, monitoring light of wavelength $\lambda c_3$ and communication light of wavelength $\lambda b$ are input to the optical branch line $1a_3$, the monitoring light of wavelength $\lambda c_3$ is reflected by the FBG 21-3, however, the communication light of wavelength $\lambda b$ is received as it is by an optical receiving portion 31-3, optical/electrical-converted by an O/E portion 32-3 and input to a reception processing portion 33-3. If the communication light of wavelength $\lambda c_1$ or the like is input to the optical receiving portions 31-1 to 31-8, there occurs a communication error with a large influence over communication. Therefore, it is necessary to cut off the monitoring light by use of the FBGs 21-1 to 21-8 with reliability. As described above, the FBGs 21-1 to 21-8 have rejection of about 60 dB of the monitoring light over the wavelength bandwidth of about 10 nm, and therefore, reliable rejection of the monitoring light is allowed. Here, the FBGs 21-1 to 21-8 are fixed by ferrules (not shown) inside the connectors 30-1 to 30-8, respectively.

Figure 3:
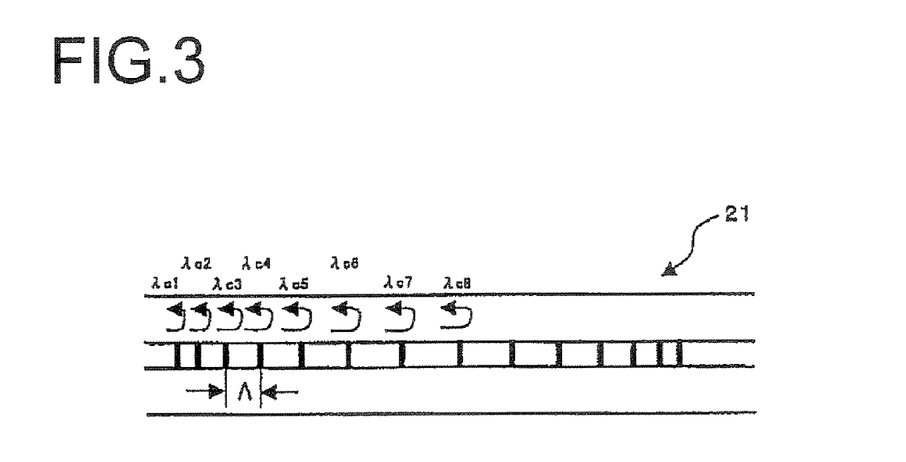
FIG. 3 is a view schematically illustrating a configuration of FBG in an embodiment 1.
Figure 4:
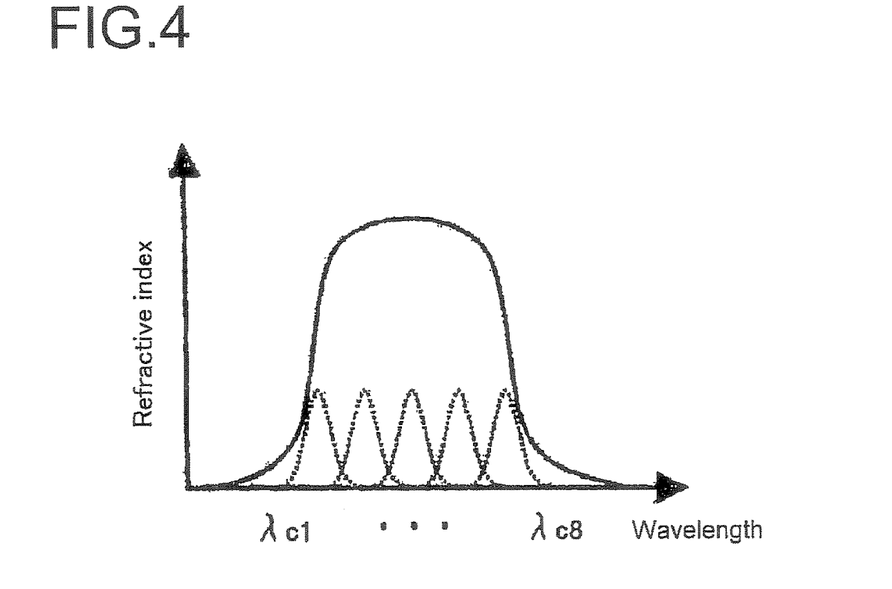
FIG. 4 is a conceptual view of a wide-band filter using the FBG.

The following description is made about a configuration of FBG 21 (21-1 to 21-8). As illustrated in FIG. 3, the FBG 21 is chirped gratings having a grating pitch $\Lambda$ between adjacent gratings varying in the longitudinal direction over the wavelengths of $\lambda c_1$ to $\lambda c_8$. As illustrated in FIG. 4, the Bragg center wavelengths are the wavelengths $\lambda c_1$ to $\lambda c_8$, reflection is allowed over the wide bandwidth of wavelengths $\lambda c_1$ to $\lambda c_8$, and light can be rejected over this bandwidth. Consequently, the ONUs 20 are allowed to use the same FBG 21 (as 21-1 to 21-8). However, the FBG may be configured to be different among 21-1 to 21-8 with respective wavelengths of the monitoring light used as a Bragg center wavelength.

The FBG 21 is configured to have a pitch Λ between adjacent gratings increasing toward the center in the longitudinal direction of the optical fiber. This grating structure is allowed to provide stable reflection of signal light over a wide bandwidth of wavelengths $\lambda c_1$ to $\lambda c_8$. This reflection is 40 dB or more over the wide bandwidth of $\lambda c_1$ to $\lambda c_8$.

Figure 5:
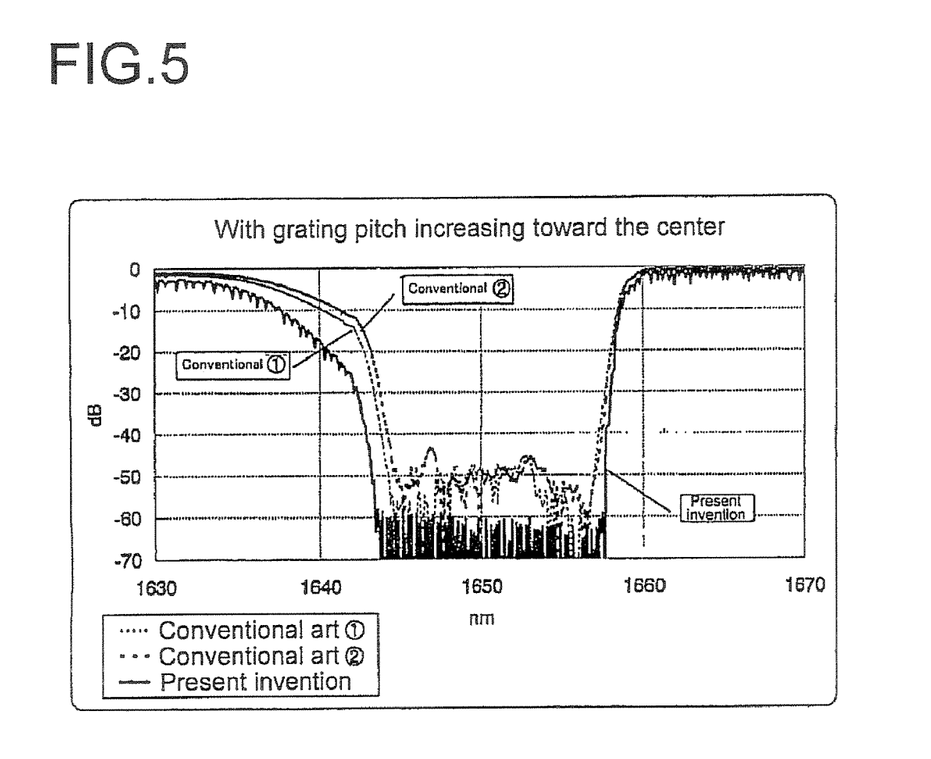
FIG. 5 is a graph showing an experimental result of rejection by the FBG element of the embodiment 1.

FIG. 5 is a graph showing rejection by the FBG 21. The FBG 21 rejects input signal light of 40 dB or more over a bandwidth of about 10 nm centered at 1650 nm. In this embodiment 1, as the grating pitch Λ of the FBG 21 is formed increasing toward the center in the longitudinal direction of the optical fiber, it is possible to provide rejection of about 40 dB or more even over the wide wavelength bandwidth of about 10 nm.

Figure 6:
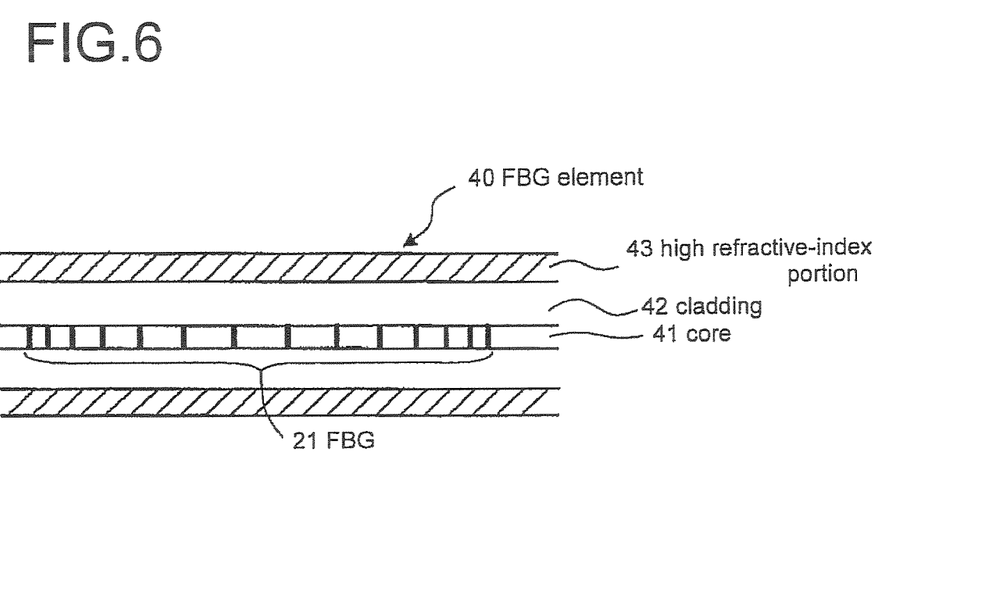
FIG. 6 is a view schematically illustrating a configuration of an FBG element of an embodiment 2.

FIG. 6 is a view of a modification of FIG. 3, illustrating an FBG element 40 including the FBG 21. In FIG. 6, a cladding 42 of the FBG element 40 has its outer surface covered with a high refractive-index portion 43 that has a refractive index higher than that of the cladding 42. The high refractive-index portion 43 preferably covers the whole FBG element 40, however may cover only a part of the FBG element 40. The high refractive-index portion 43 may use any material that has a refractive index higher than that of the cladding 42, such as matching oil or an adhesive agent. The high refractive-index portion 43 may have the refractive index higher than that of a core 41.

Figure 7:
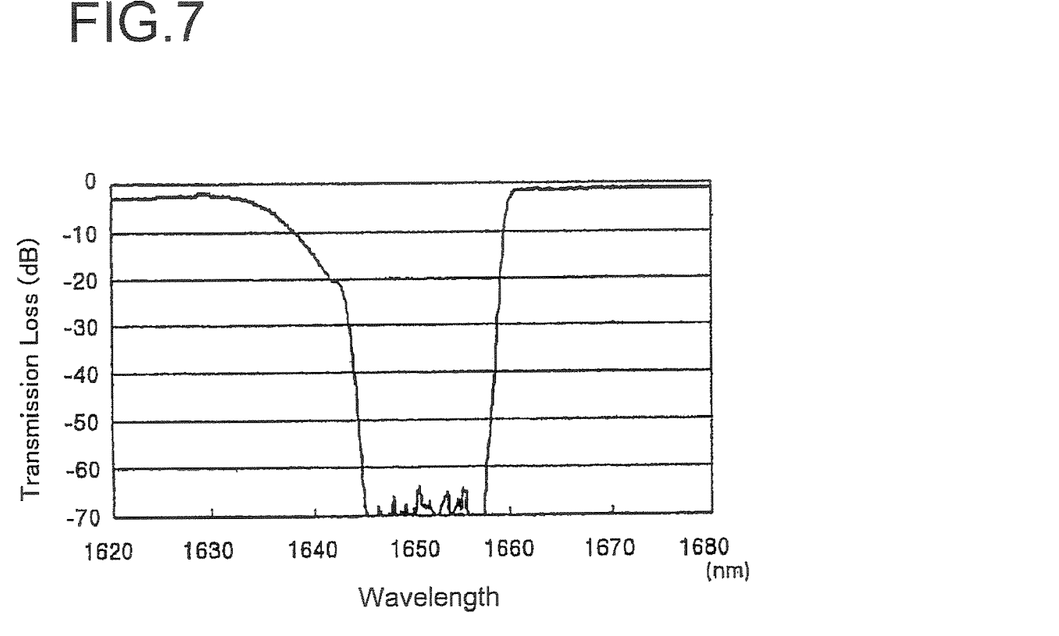
FIG. 7 is a graph showing an experimental result of rejection by the FBG element of the embodiment 2.

FIG. 7 is a graph showing rejection by the FBG element 40. In FIG. 7, the matching oil is used in the high refractive-index portion 43, and the FBG element 40 shows rejection of 60 dB or more of input light over a bandwidth of about 10 nm having a center wavelength of 1650 nm. Here, the transmission loss fluctuates in the vicinity of −70 dB because of measurement limits.

In this embodiment 1, as the FBG 21 is formed such that the grating pitch Λ of adjacent gratings increases toward the center in the longitudinal direction of the optical fiber in which the FBG is formed, it is possible to provide rejection of about 40 dB or more even over the wide bandwidth of about 10 nm.

Figure 8:
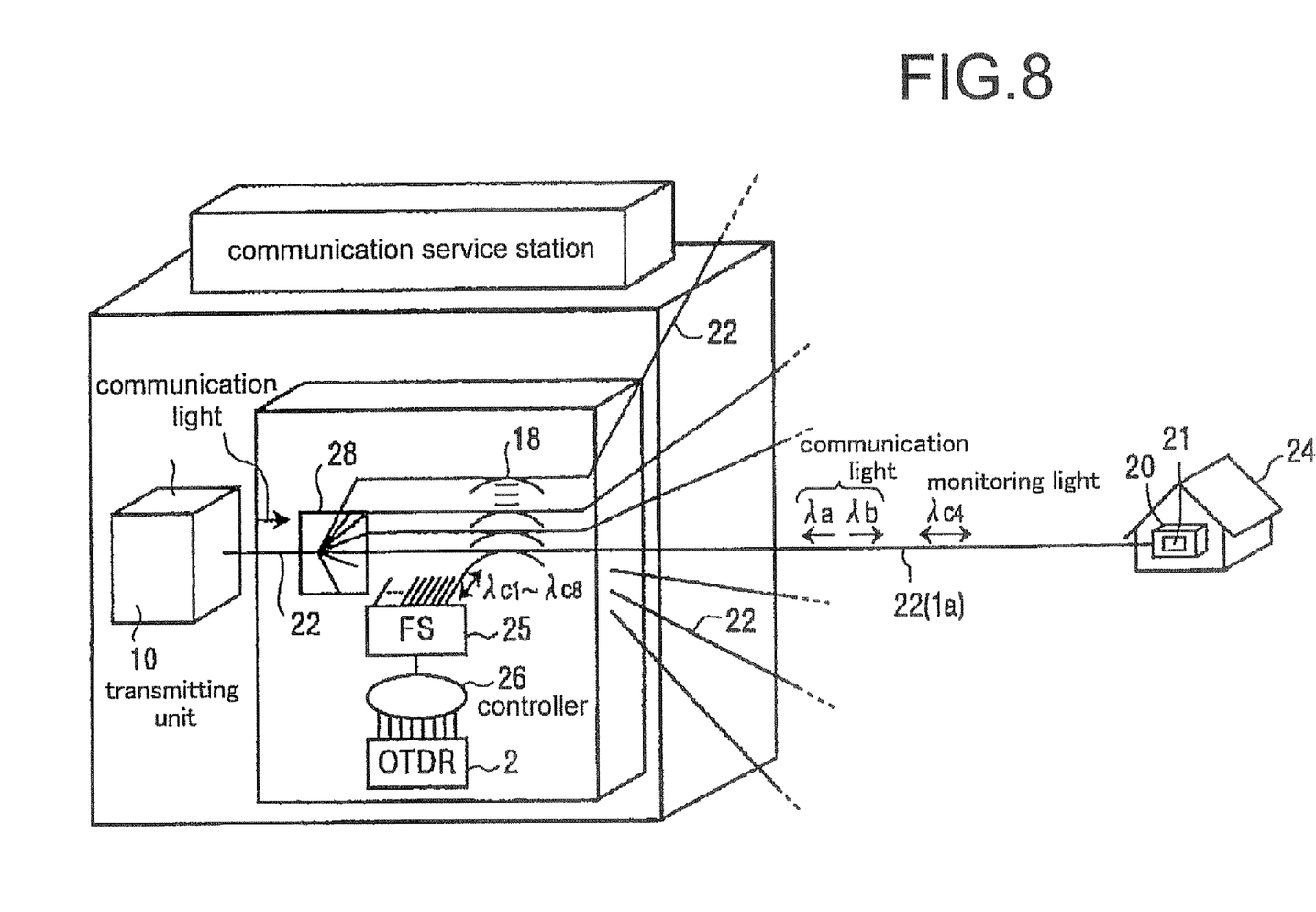
FIG. 8 is a block diagram illustrating another system adopting a fiber Bragg grating element according to the present invention.

Here, in FIG. 1, the line is divided into optical branch lines $1a_1$ to $1a_8$ by the optical splitter 3. However, a configuration illustrated in FIG. 8 may be adopted such that the line is divided into optical branch lines $1a_1$ to $1a_8$ by an optical splitter 28, each of the optical branch lines $1a_1$ to $1a_8$ is then, directly connected to an ONU 20 and monitoring light is input into or output from the line via an optical coupler 18. In this configuration, the monitoring light is preferably of a single wavelength (for example, $\lambda c_4$). This is because light emitted by the OTDR 2 shows a large shift of the center wavelength and therefore, an FBG 21 is required to reject light over a wide bandwidth that exceeds 1 nm per Bragg center wavelength.

Embodiment 2

Next description is made about an embodiment 2. In the above-described embodiment 1, the FBG 21 is formed in a single optical fiber. In other words, the gratings are formed in a single optical fiber such that the grating pitch increases toward the center in the longitudinal direction of the optical fiber. In this embodiment 2, instead of the gratings formed in the single optical fiber, two optical fibers are prepared each having gratings formed with a grating pitch Λ increasing toward its end and the ends of the two optical fibers are fusion-bonded to each other thereby to form an FBG.

Figure 9:
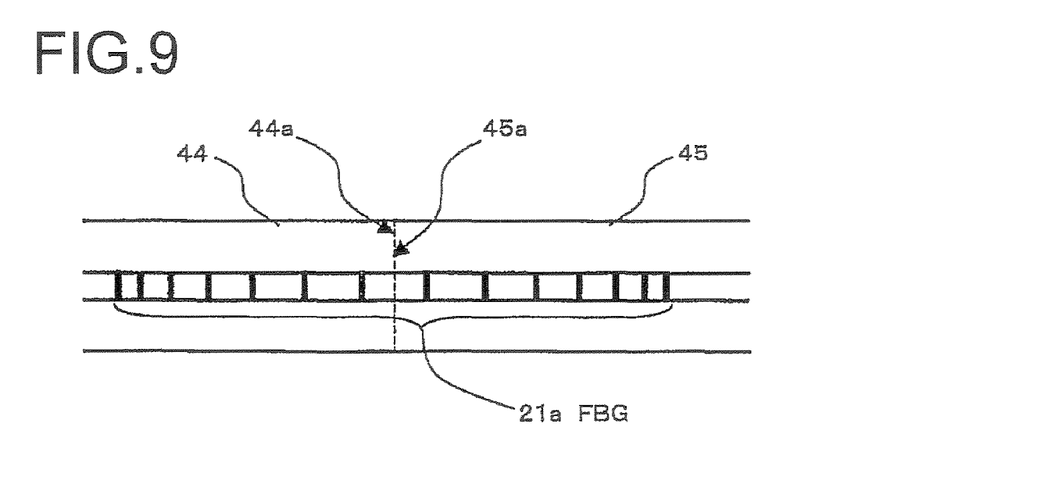
FIG. 9 is a view schematically illustrating a configuration of an FBG element of an embodiment 3.

FIG. 9 is a vertical cross-sectional view of an FBG 21$a$ of the embodiment 2 of the present invention. The FBG 21$a$ is formed in two optical fibers 44 and 45 each having gratings with a grating pitch Λ increasing toward its end and being fusion-bonded to each other at the respective ends 44$a$ and 45$a$. This FBG 21$a$ is finally formed, like in the embodiment 1, with the grating pitch Λ increasing toward the center in the longitudinal direction of the connected optical fibers (toward the ends 44$a$ and 45$a$ of the respective optical fibers 44 and 45 in FIG. 9) and almost the same rejection as in the embodiment 1 can be obtained. In other words, the rejection of the FBG 21$a$ in FIG. 9 is identical to that shown in FIG. 5. As the FBG 21$a$ is formed as shown in FIG. 9, it is possible to shorten the UV radiation width (the length of each optical fiber radiated with UV) in forming of the gratings, which enables easy manufacturing and highly accurate forming of the gratings.

Embodiment 3

In the above-described embodiments 1 and 2, the FBGs 21 and 21$a$ are formed only in the core 41 such that the grating pitch Λ increases toward the center in the longitudinal direction of the optical fiber. Now, in this embodiment 3, the FGB is chirped gratings formed not only in the core but in the cladding.

Figure 10:
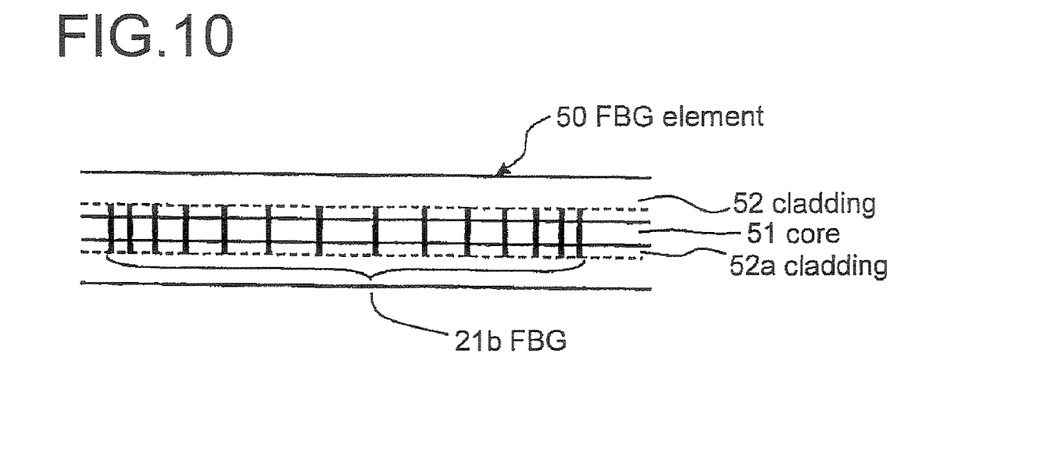
FIG. 10 is a view schematically illustrating a configuration of an FBG element of an embodiment 4.

FIG. 10 is a vertical cross-sectional view of an FBG element 50 having an FBG 21$b$ of the embodiment 3. As illustrated in FIG. 10, the FBG 21$b$ of the FBG element 50 is formed in both the core 51 and a cladding 52$a$ which is a part of the cladding 52. The FBG 21$b$ formed in the cladding 52$a$ prevents light propagating through the cladding 52 from being leaked to the output side (to the right side on FIG. 10). The chirped gratings in this cladding 52$a$ are formed by doping the cladding 52$a$ with almost the same amount of Ge as that of the core 51 and performing two-beam interferometry, phase mask or the like, like in forming the chirped gratings in the core 51. In the embodiment 3, the cladding 52$a$ is doped with Ge, however the dopant is not limited to Ge and any dopant that allows chirped gratings to be formed in the cladding 52$a$ may be used. For example, the cladding 52$a$ may be doped with a material photosensitive to ultraviolet radiation such as phosphorus. Besides, the high refractive-index portion 43 shown in FIG. 6 may be formed on the outer surface of the cladding 52, when necessary.

According to this embodiment 3, it is also possible to realize the FBG element 50 capable of obtaining rejection of about 40 dB and more over the wide bandwidth of about 10 nm.

Embodiment 4

Next description is made about an embodiment 4. In the embodiment 3, chirped gratings are formed in the cladding 52. Now in this embodiment 4, the core has a higher refractive index than usual.

Figure 11:
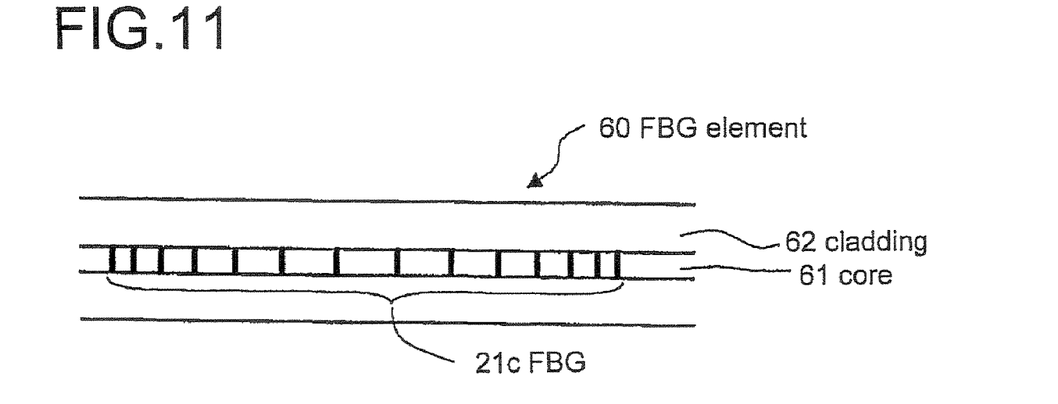
FIG. 11 is a view schematically illustrating a configuration of an FBG element of an embodiment 5.

FIG. 11 is a vertical cross-sectional view of an FBG element 60 having an FBG 21$c$ according to the embodiment 4 of the present invention. As illustrated in FIG. 11, the FBG 21$c$ of the FBG element 60 is chirped gratings formed in the core 61, like in the core 41 of the embodiment 1. Here, the core 61 has a refractive index higher than the refractive index of a cladding 62, and the numerical aperture (NA) is preferably 0.2 or more. In addition, the high refractive-index portion 43 shown in FIG. 6 may be formed on the outer surface of the cladding 62 when necessary.

Figure 12:
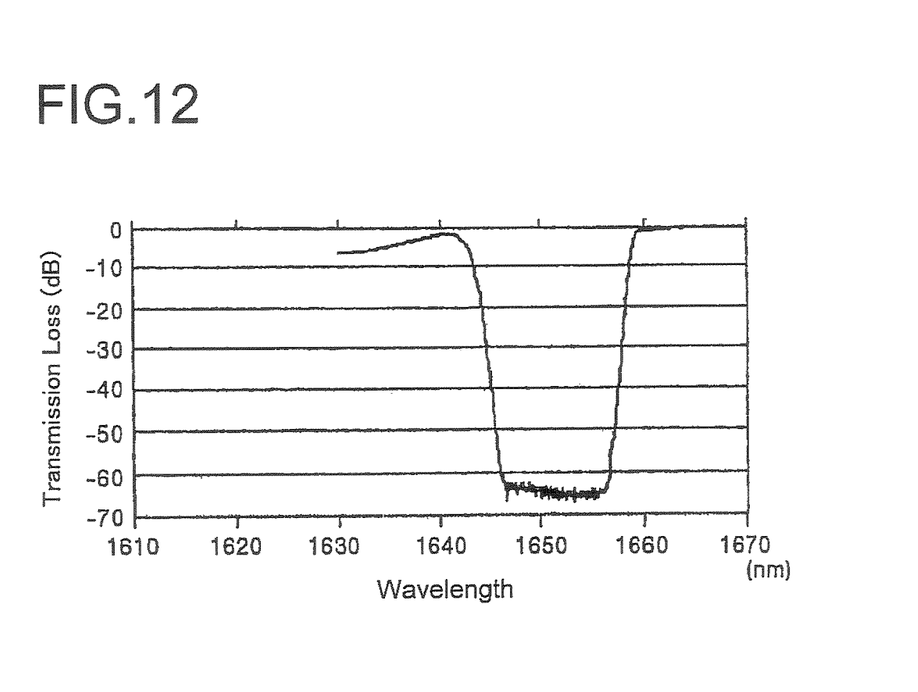
FIG. 12 is a graph showing an experimental result of rejection by the FBG element of the embodiment 5.

FIG. 12 shows rejection of the FBG 21c formed in a fiber with a numerical aperture of 0.34. As shown in FIG. 12, it is also possible to realize a rejection of 40 dB or more over a wide bandwidth of about 10 nm centered at 1650 nm.

Embodiment 5

Next description is made about an embodiment 5. In the above-described embodiment 4, the refractive index of the core 61 is set higher than that of cladding 62. Now in this embodiment 5, the refractive index of a peripheral portion of the core is lower than the refractive index of the cladding.

Figure 13:
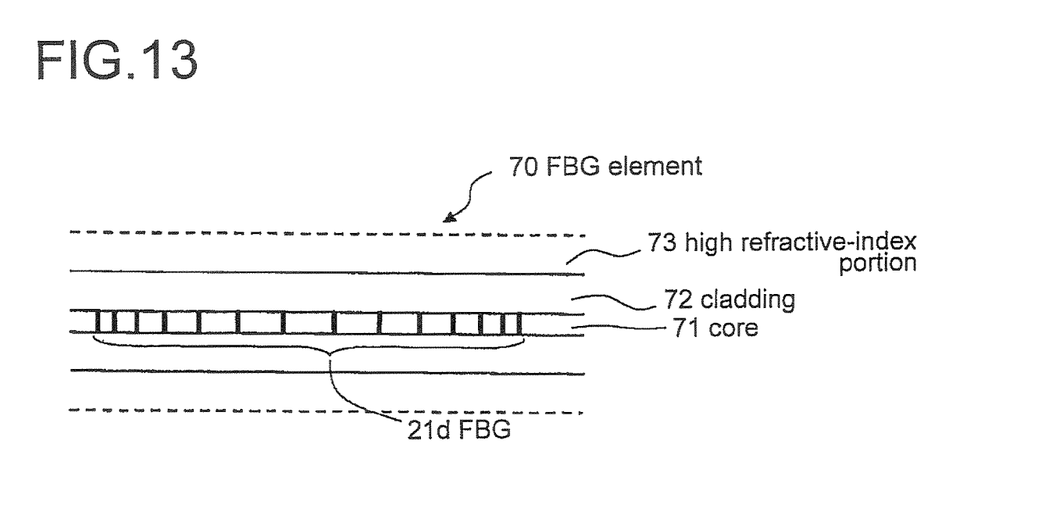
FIG. 13 is a view schematically illustrating a configuration of an FBG element of an embodiment 6.

FIG. 13 is a vertical cross-sectional view of an FBG element 70 having an FBG 21d according to the embodiment 5 of the present invention. As illustrated in FIG. 13, the FBG 21d of the FBG element 70 is chirped gratings formed in the core 71, like in the core 41 of the embodiment 1. In the core 71, the refractive index of a peripheral portion of the core 71 is lower than that of the cladding 72, which provides the fiber with a W-shaped refractive-index profile (displaced clad fiber). This W-shaped refractive-index profile prevents coupling of the cladding mode in the cladding 72. Further, as illustrated in FIG. 13, a high refractive-index portion 73 may be provided to prevent the cladding mode itself from existing. In any case, it is possible to eliminate the influences by the cladding mode, thereby allowing significant improvement of rejection.

Also in this embodiment 5, it is possible to realize the FBG element 70 capable of obtaining a rejection of about 40 dB or more over the wide bandwidth of about 10 nm.

INDUSTRIAL APPLICABILITY

The present invention is applicable to optical communication devices which need an optical filter capable of high rejection filtering of an input optical signal over a wide bandwidth.

The invention claimed is:

1. A fiber Bragg grating element performing high rejection filtering on an input optical signal over a predetermined bandwidth, the fiber Bragg grating element comprising:
   a plurality of gratings formed in an optical waveguide having a core and a cladding around the core, the plurality of gratings formed continuosly along a predetermined portion of said optical waveguide, said predetermined portion having a beginning, a center, and an end,
   the gratings being formed with a grating pitch between adjacent two of the gratings increasing toward the center of the predetermined portion in a longitudinal direction of the optical waveguide.

2. A fiber Bragg grating element performing high rejection filtering on an input optical signal over a predetermined bandwidth, the fiber Bragg grating element comprising:
   a plurality of gratings formed in an optical waveguide having a core and a cladding around the core, the plurality of gratings formed along a predetermined portion of said optical waveguide, said predetermined portion having a beginning, a center, and an end,
   the optical waveguide having two optical fibers bonded at respective ends to each other, each of the respective ends having a subset of the plurality of gratings, and
   respective subsets of the gratings being formed continuosly between the optical fibers with a grating pitch between adjacent two of the gratings increasing toward the respective ends, said respective ends being bonded together.

3. The fiber Bragg grating element of claim 1 or 2, wherein the cladding of the optical waveguide is doped with a material photosensitive to ultraviolet radiation so that same gratings as the gratings in the core are formed in the cladding.

4. The fiber Bragg grating element of claim 1 or 2, wherein the optical waveguide has a numerical aperture equal to or greater than 0.2.

5. The fiber Bragg grating element of claim 1 or 2, wherein the core of the optical waveguide has a peripheral portion of ring-shaped section having a refractive index higher than a refractive index of the core, and the gratings are formed in at least the core.

6. The fiber Bragg grating element of claim 1 or 2, wherein in the optical waveguide, the gratings are formed in at least the core, and a material having a refractive index higher than a refractive index of the cladding is provided on an outer surface of the cladding so as to cover the gratings in the core partially or entirely.

7. The fiber Bragg grating element of claim 1 or 2, wherein the predetermined bandwidth is equal to or greater than 10 nm.

8. The fiber Bragg grating element of claim 1, wherein a rejection is equal to or greater than 40 dB over the predetermined bandwidth.

9. The fiber Bragg grating element of claim 2, wherein a rejection is equal to or greater than 40 dB over the predetermined bandwidth.

10. The fiber Bragg grating element of claim 7, wherein a rejection is equal to or greater than 40 dB over the predetermined bandwidth.

\* \* \* \* \*